UNITED STATES PATENT OFFICE.

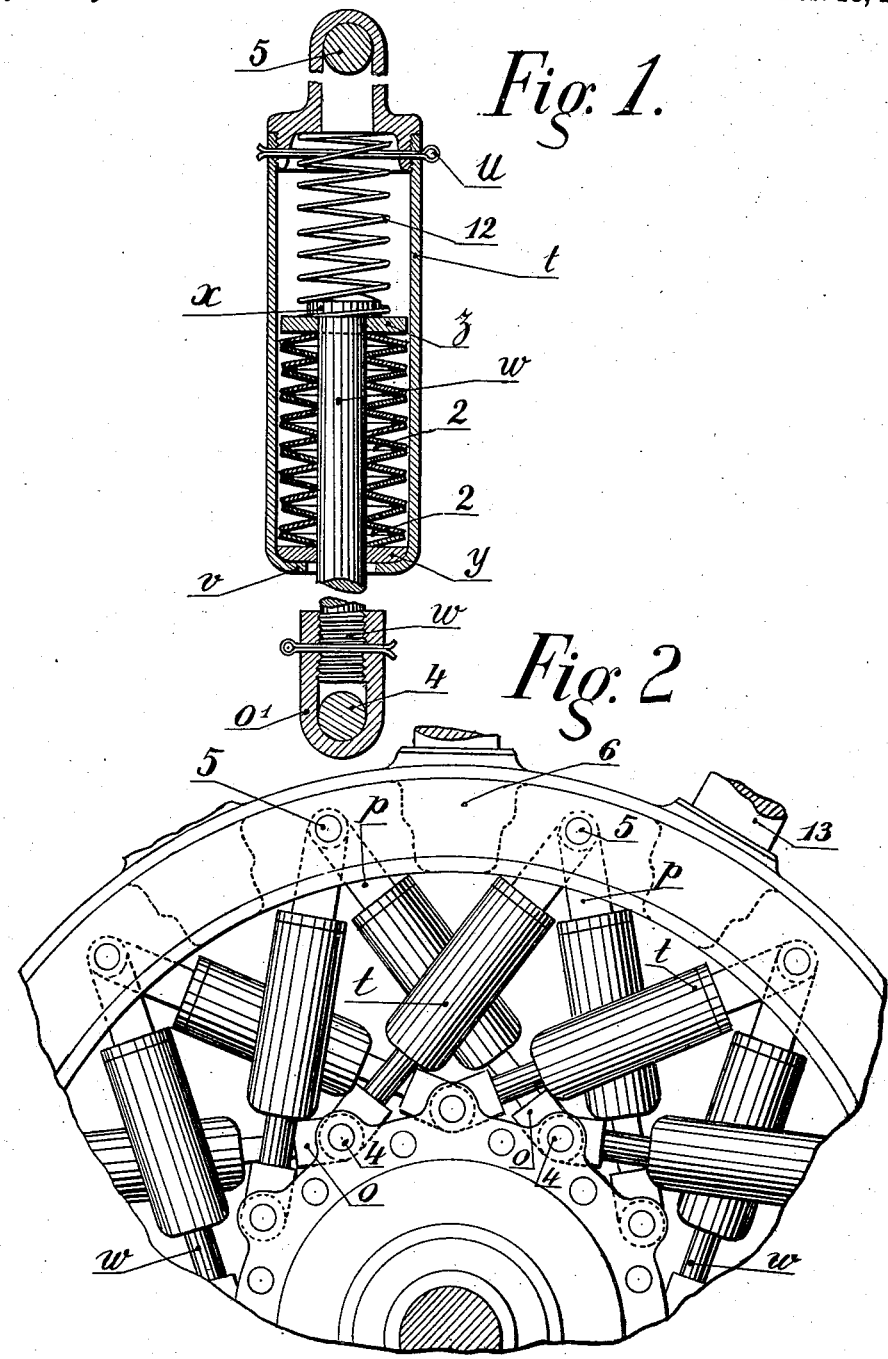

LOUIS ANTOINE GARCHEY, OF PARIS, FRANCE.

ELASTIC WHEEL.

1,017,259.          Specification of Letters Patent.      Patented Feb. 13, 1912.

Application filed December 16, 1908. Serial No. 467,845.

*To all whom it may concern:*

Be it known that I, LOUIS ANTOINE GARCHEY, a citizen of the French Republic, and resident of Paris, France, have invented certain new and useful Improvements in Elastic Wheels, of which the following is a specification.

This invention relates to a wheel with elastic spokes, which is characterized by the particular construction of the spokes. Each spoke is composed of a metal part destined to receive the stress and which is not used for giving elasticity to the wheel, and of a second part which is elastic and consists of a suitable number of separate organs which are arranged in series, that is to say, so that their actions are superposed. These elements are constituted by Belleville washers. The spokes are placed tangentially to the hub and in two series, that is to say, so that two spokes which are tangential to the hub are attached to one point of the rim. Owing to this particular construction, very strong wheels can be made in which, on the one hand, the driving force is transmitted to the felly from the hub by the intermediary of the elastic spokes, which on the other hand serve for transmitting the braking force exerted upon the felly to the hub.

The improved elastic wheel is shown in the accompanying drawings.

Figure 1 shows the spoke in section. Fig. 2 shows part of a wheel in elevation.

Each spoke consists of a steel tube $t$ having an eye-piece $p^1$ screwed into its upper end which is maintained in its position by means of a cotter $u$. The tube is closed at the lower end by a curved bottom plate $v$ which has a central opening for the bolt $w$ which at its upper end is guided in a disk $z$. Upon the lower threaded end of the bolt $w$ the eye-piece $o^1$ is screwed. Said lower end of bolt $w$ projects from the lower end of tube $t$ and is guided in a disk $y$ placed upon the bottom of said tube. Between the two guide-disks $z$ and $y$ a suitable number of Belleville-washers are inclosed which are placed the one upon the other so that their concave faces are alternately turned up or down. Said Belleville-washers 2 have a central boring in which the bolt $w$ is guided.

In this elastic spoke the stress is divided between a great number of identical elements, and its elasticity is equal to the sum of the elasticity of the several elements.

Between the eye-piece $p^1$ and the guide disk $z$ a spiral spring 12 is inclosed which serves to hold the Belleville-washers 2 well in contact the one with the others.

The elastic spokes are arranged as follows:—To each of the bolts 4 or 5 two spokes are attached, the one inclined with regard to the other and situated the one at the inner side and the other at the outer side of the median plane of the wheel. Rim 6 is connected to the felly by ordinary wooden spokes 13.

I claim:—

An elastic spoke for wheels comprising in combination a metal tube fixed to the rim, said tube being closed at its inner end but having an opening in said closed end, a metal bolt fixed to the hub and having a head at its opposite end, said bolt passing through said opening and telescoping in said tube, a guide disk on said bolt bearing against the head thereof, an elastic element consisting of superposed Belleville-washers interposed between said disk and the inner closed end of said tube, and a spiral spring inserted between said guide disk and the upper narrow end of the tube, substantially as described and shown and for the purpose set forth.

In witness whereof I have hereunto set my hand in the presence of two witnesses.

LOUIS ANTOINE GARCHEY.

Witnesses:
    ALFRED FREY,
    H. C. COXE.